United States Patent
Lu et al.

(10) Patent No.: US 7,463,622 B2
(45) Date of Patent: Dec. 9, 2008

(54) INTEGRATED COMMUNICATION TERMINAL FOR NEXT GENERATION MOBILE TELECOMMUNICATIONS

(76) Inventors: Wei Lu, 1218 Bubb Rd., Cupertino, CA (US) 95014; Jianhong Hu, 1218 Bubb Rd., Cupertino, CA (US) 95014

( * ) Notice: Subject to any disclaimer, the term of this patent is extended or adjusted under 35 U.S.C. 154(b) by 0 days.

(21) Appl. No.: 10/904,422

(22) Filed: Nov. 10, 2004

(65) Prior Publication Data

US 2005/0130611 A1    Jun. 16, 2005

(51) Int. Cl.
*H04Q 7/22* (2006.01)
*H04L 12/56* (2006.01)
*H04L 12/50* (2006.01)

(52) U.S. Cl. .................. 370/352; 370/328; 370/338; 370/401; 455/445; 455/433

(58) Field of Classification Search .................. 455/445, 455/433, 432.1, 412.1, 412.2, 413; 370/352–356, 370/400, 401, 395.2–395.31, 328–338, 351, 370/310

See application file for complete search history.

(56) References Cited

U.S. PATENT DOCUMENTS

| | | | | |
|---|---|---|---|---|
| 6,751,204 | B1 * | 6/2004 | Foti et al. | 455/445 |
| 2003/0224795 | A1 * | 12/2003 | Wilhoite et al. | 455/445 |
| 2006/0072537 | A1 * | 4/2006 | Lee et al. | 370/349 |

* cited by examiner

*Primary Examiner*—Philip J Sobutka

(57) ABSTRACT

An advanced communication terminal system of integrating mobile communications, wireless access systems and wireline communications into one open architecture platform supporting cost-effective broadband services in both wireless and wired communication environment with one integrated terminal device in order to maximize the wireless spectrum utilization and optimize the network resource management.

11 Claims, 5 Drawing Sheets

Call Processing Management System in Mobile Switching Center or Gateway

Hardware Architecture of Integrated Wired and Wireless Mobile Terminal

Call Processing Management System in Mobile Switching Center or Gateway

Network Access Control in The Integrated Terminal
(Wired/W-LAN/GSM/CDMA 4-in-1 Integrated Terminal for example)

INTEGRATED COMMUNICATION TERMINAL FOR NEXT GENERATION MOBILE TELECOMMUNICATIONS

BACKGROUND OF THE INVENTION

1. Field of the Invention

This invention relates to an advanced open communication terminal system and method of integrating the mobile communications, wireless access systems and wired communications into one common platform architecture, supporting cost-effective broadband voice, data and video services in both wireless and wired environment with one single integrated terminal. The invention includes improved system architecture in the integrated terminal and minimum modification in the existing mobile communication infrastructures.

2. Description of the Related Art

Wireless communications comprises a wide range of technologies, services and applications that have come into existence to meet the particular needs of different market sectors and user environments. Different systems can be broadly characterized by:

content and services offered;
 frequency bands of operation;
 standards defining the systems;
 data rates supported;
 bidirectional and unidirectional delivery mechanisms;
 degree of mobility;
 regulatory requirements; and
 cost.

The service requirements for telecommunications remain the following characteristics:

Speech and SMS (Short Message System):

This service type requires a peak bit rates up to 16 kbps. In the year 2010 onwards, there will still remain needs for these very low data rate applications of speech and simple message service. In addition to that, some applications in the field of sensor communication and/or low bit rate data telemetry would also be expected for the category, as ubiquitous communications. Most of mobile e-commerce applications would also be categorized in this type.

Multimedia and Low Rate Data:

This service type at a data rate of less than 144 kbps should also be considered, taking into account the compatibility with 3G and 2G data communication applications.

Medium Multimedia:

This type support a peak bit rate of up to 2 Mbps. This type would be required to sustain the compatibility with the 3G applications.

High Multimedia:

This type should be considered in order to accommodate high data rate applications, including multi-media video streaming services, which are provided with broadband service in fixed wired communication systems or with broadband wireless access systems.

Super High Multimedia:

This type should also be considered in order to accommodate super high data rates multi-media applications, which are currently provided with Fibre-to-the-Home (FTTH) services in case of wired communication systems.

Currently, these services require different communication devices with different connection facilities that the users need frequent switch between various terminals at home, office and in other environments.

A service usage pattern may be categorized according to an area where users exploit similar services and expect similar quality of service.

Home
 Office
 Public area
 Wide area

In many countries, Internet access in Home, Office and Public Area becomes very popular and affordable. Meanwhile, WLAN (wireless local area network) access is evolving rapidly in these domains.

Second generation (2G) systems were mainly designed for applications such as voice. Third generation (3G) and especially, beyond third generation (B3G) mobile system will increasingly be designed as combination of different access technologies to complement each other in an optimum way for different service requirements and radio environments in order to provide a common and flexible service platform for different services and applications.

Access to a service or an application may be performed using one system or may be performed using multiple systems simultaneously or alternatively. Specifically, as will be described within the context of the present invention and has yet been un-addressed in the art, such improved technology could include an integrated communication system which will combine the wireless mobile communication, wireline communication, wireless local area network and Internet into one common platform so that the single Mobile Terminal can operate as a home phone, office phone, mobile phone and open terminal with single user number, which is the unique identifier of this integrated mobile terminal.

In the future operators may deploy a mix of technologies that could, at various stages in time and subject to market and regulatory considerations, incorporate cellular, WLAN, digital broadcast, satellite and other access systems as provided by the present invention. This will require the seamless interaction of these systems in order for the user to be able to receive a variety of content via a variety of delivery mechanisms depending upon the particular terminal capabilities, location and user profile.

Different radio access systems will be connected via the open and flexible core networks. In this way, an individual user can be connected via a variety of different access systems to the networks and services he desires. The integration between these different access systems in terms of horizontal and vertical handover and seamless service provision with service negotiation including mobility, security and QoS management will be a key requirement.

Due to the different application areas, cell ranges and radio environments, the different access systems can be organized in a layered structure similar to hierarchical cell structures in cellular mobile radio systems. The different layers correspond to the:

Distribution layer: This layer comprises digital broadcast type systems to distribute the same information to many users simultaneously through unidirectional links.
 Cellular layer: The cellular layer may comprise several cell layers with different cell size and or different access technologies.
 Hot spot layer: This layer may be used for very high data rate applications, very high traffic density and individual links, e.g. in very dense urban areas, campus areas, conference centers, and airports.
 Personal network layer: Personal area networks will support short range direct communication between devices.
 Fixed(Wired) layer: This layer includes any fixed wireline access system.

Such an integrated system as provided by the present invention could intelligently converge mobile communications, Internet, wireline communications, wireless LANs, etc into an integrated open platform. Each of these represents a variety of applications, services and delivery mechanisms. These differing information flows are desired by the users to be available regardless of the means and manner of delivery. A case in point: Over this integrated mobile terminal one is able to receive voice communications, data messages, browse the web, transmit video, listen to MP3 music, etc. The most important is, this mobile terminal becomes the All-in-One integrated personal communicator at both home and office or on-the-move.

SUMMARY OF THE INVENTION

This invention is directed to an integrated communication terminal for next generation mobile telecommunications to support the convergence and integration of various wireless standards including existing and future mobile cellular standards, wireless local area network standards, wireless personal area network standards, and wireline standards.

It is assumed that 2G, 3G (in its present state), B3G, new mobile access and nomadic/local area wireless access elements are considered to be a system as a whole. This converged and integrated communication platform as provided by the present invention, rather than separate and single mode of standards, will definitely drive the future telecommunication industry, but with new business model for service providers and operators.

Continuous evolution is foreseen in future mobile terminals, with use of new components, architectures, hardware, software platforms and improved user interfaces together providing increased performance. The key technologies that will enable the future advanced mobile terminals as described in the present invention include:

Open platform supporting multiple standards
Smart antennas, MIMO
High efficiency power amplifiers
New filters
Improved RF (radio frequency) modules, allowing higher operating frequencies and improved receiver sensitivity
Advances in signal processing, additional processing power
Improved battery technology with increased energy density
Integration with wired terminal However, these advances in technology will not altogether remove the frequency dependent limitations of transmitter and receiver hardware and semiconductor technology. Rather limitations will continue to exist despite the evolution. Having new spectrum ranges far from current bands would additionally increase the challenges with future RF components. This means that also from the component point of view the frequencies should be as low as possible.

Furthermore, the aforementioned terminals are capable of operating in several frequency bands and with different bandwidths (requiring improved RF modules). Terminals have the potential of dealing with different systems (multi-mode) and they can also implement interference management to improve transmission capacity and performance (enhanced sensitivity and strategies for interference suppression).

Therefore, the integrated terminal of the present invention provides an open RF architecture which is reconfigurable and portable for various wireless air-interfaces in different frequency bands, as well as supporting new transceiver technologies, for example, smart antenna, space-time receiver and new power amplifier.

Anticipating the evolution of the worldwide mobile communication penetration for the next twenty years is a challenging work. In this timeframe, as the world population increases by 22% (from 6.2 Billion in 2002 up to 7.6 Billion in 2020), many factors will influence the particular situation of each country and their telecommunication development. The forecasts for the evolution of telecommunication penetration developed are based on the general socio-economic context and perspectives of each country. However, the following trends are clear:

Mobile phone will be much more popular
Internet access is everywhere and much more affordable
Voice over IP is becoming popular
Wireless LAN (Local Area Network) and Wireless PAN (Personal Area Network) will be much more popular at home, office or hotspot areas The advanced system and method provided by the present invention enable the full integration of the above technologies so as to substantially increase the productivity and versatility of the communications services offered.

The invention of this integrated terminal includes the following parts:

First, the system and method of the present invention incorporates a communication terminal integrating the Wireless LAN technology, Wireless PAN technology, Voice over IP (VoIP) technology and Wireline Internet Access technology with the existing common air interfaces mobile communication standards (for example, cdma2000, WCDMA, GSM, GPRS, TD-SCDMA, OFDM, etc) through the Open Wireless Architecture (OWA) platform of the present invention. OWA defines the open interface standard for each subsystem and function unit so that the system is open for upgrade and reconfiguration. The method of present invention supports any short range wireless access technologies including Wireless LAN and Wireless PAN, but not limited thereto. Also, as utilized hereinafter the term "common air interface mobile standards" refers to any type of mobile cellular technology operable in the fashion of "TDMA or CDMA or OFDM" but not limited thereto.

Second, the integrated terminal of the present invention supports multiple standards of both wireless and wireline communications wherein Software Defined Module (SDM) is used to install or update the different communication standards module in case of need. This SDM can be stored in an External Card, for example, flash memory card, SIM card (as used in GSM system), or downloadable from the Internet. The External Card of the SDM may also contain independent processor, DSP (Digital Signal Processor) or other components in addition to memory unit to facilitate additional system processing.

Third, the integrated terminal of the present invention supports open interface between the main functional units of the terminal and the RF/IF Subsystem so that the terminal RF/IF part is portable and reconfigurable. This method of the present invention is necessary when the different wireless standards run in different frequency bands which are not within same RF/IF transceiver limit. This open and portable RF/IF architecture of the present invention is also very important to support new wireless transceiver technologies including smart antennas, MIMO (Multiple Input, Multiple Output), High efficiency power amplifiers, Improved RF modules allowing higher operating frequencies and improved receiver sensitivity, etc.

Fourth, the integrated terminal of the present invention incorporates automatic network access capabilities, wherein the terminal system searches the available network access in the order of wired network, Wireless LAN, mobile cellular network for example, but not limited thereto. The search order can be redefined or managed by the user. When the wired network is detected, this integrated terminal becomes the wireline terminal and the communication is established by IP connection including IP data and VoIP for voice. If wired network is not available, and Wireless LAN is detected (through various detection mechanisms), this integrated terminal becomes the Wireless LAN terminal and the communication is established by IP connection too. Wireless LAN access is regarded as the wireless extension of the wireline network access in the local short range domain. If both wired network and Wireless LAN are not available, the system of the present invention will search other short range wireless access networks including Wireless PAN, etc. In the event that all these networks are not detected, the integrated terminal will switch back to the mobile cellular mode wherein common mobile air interface standards (for example, GSM, cdma2000, WCDMA, etc) will be employed based on the mobile preference list set by the user. The mobile cellular modules supported in the integrated terminal of the present invention can be stored in the terminal itself, or in the External Card or downloaded from the Internet in the form of the aforementioned SDM. The integrated terminal device associated with the system and method of the present invention is therefore capable of being operative in an open wireless and wireline communication environment supporting various standards and interfaces.

Fifth, the system and method of present invention incorporates a new Call Processing Management subsystem capability in the Mobile Switching Center (MSC) and/or Mobile Gateway, wherein the incoming mobile calls associated with the called mobile phone number are queued for further connecting to the destination terminal based on the Connection Table containing the current network access status of the destination terminal as set forth above. If this destination terminal connects to the wired Internet network (first priority for example) or Wireless LAN, the aforementioned incoming call is forwarded to the destination terminal directly through IP connection by IP-calling from MSC to the destination terminal as set forth above, wherein the Visitor IP address reported by the destination terminal is dialed, and VoIP protocol is activated and employed if this incoming call is a voice call. If the destination terminal, as set forth above, does not connect to both the wired network and the wireless LAN, but connects to the mobile cellular network (for example, TDMA and/or CDMA), the aforementioned incoming call is forwarded to the related Base Station wherein the communication with the destination terminal is over the wireless air link of available mobile cellular standards. In case the destination terminal, as set forth above, is not able to access any available networks, the MSC can forward the aforementioned incoming call to the user Home Server which is configured as a Virtual Mobile Server through IP connection, as will be described within the context of the present invention.

Sixth, the system and method of present invention comprises the utilization of the user home computer server with Internet access as the Virtual Mobile Server, as set forth above, supporting the aforementioned integrated terminal of the present invention with enhanced functions and services, for example, mobile secretary, mobile office, User Webpage, Voice Mailbox, Short Message Service (SMS), Multimedia Message Service (MMS) and Document Center, etc. This Virtual Mobile Server, as set forth above, also takes the function of Special Service Management for the aforementioned integrated terminal on mobile location, emergency call, information collection, security and safety control, and network O&M (Operation and Maintenance), etc. Additionally, one Virtual Mobile Server, as set forth above, can support one or multiple integrated terminals of the present invention, wherein many such terminals can share the same Virtual Mobile Server.

Seventh, the system and method of present invention introduces a new innovative solution to converge and integrate the various communication devices into one open platform, wherein the conventional home phone, office phone and cellular phone, etc are combined together into an integrated terminal, as set forth above, with one single communication number. Furthermore, the aforementioned integrated terminal of the present invention utilizes the existing or any future communication standards (including both wireless and wireline standards) rather than relying on new defined transmission technologies. Specifically, as described within the context of the present invention, the aforementioned integrated terminal is just an improvement of the existing communication device, wherein this integrated terminal, as set forth above, is operable in each individual communication standard and backwards compatible to the same transmission technology.

Lastly, the system and method of present invention comprises the best and optimal utilization of the existing communication infrastructure, wherein almost all existing telecommunication equipments, including MSC (Mobile Switching Center), BS (Base Station), Gateway and Router, and backbone networks, remain unchanged and fully operable.

The advantage of the integrated communication system and method of the present invention includes remarkable improvement of spectrum efficiency in mobile cellular bands, improvement in network resource, optimization in network interoperability, enhancement of the emerging broadband availability, convergence of entertainment and Voice/Data services, interaction and integration of various communication devices and defining the future intelligence of truly smart communication environment. More specifically, the system of the present invention provides the capability of the true Personal Communications, wherein one single terminal with one number manages all personal communications needs everywhere and anytime.

All these and other introductions of the present invention will become more clear when the drawings as well as the detailed descriptions are taken into consideration.

BRIEF DESCRIPTION OF THE DRAWINGS

For the full understanding of the nature of the present invention, reference should be made to the following detailed descriptions with the accompanying drawings in which.

Like reference numerals refer to like parts throughout the several views of the drawings.

DESCRIPTION OF THE PREFERRED EMBODIMENT

The present invention relates to a system and method of integrated communication terminal wherein the mobile cellular standards, including existing or future standards, can integrate the short range wireless access standards (for example, Wireless LAN and Wireless PAN) and wireline network standards including Internet, into an open communication platform so that the same integrated terminal device can be operable in various communications environment to maximize the wireless spectrum utilization, and broadband services and applications, as well as optimize the network resource management and system capacity management.

Figure 1:
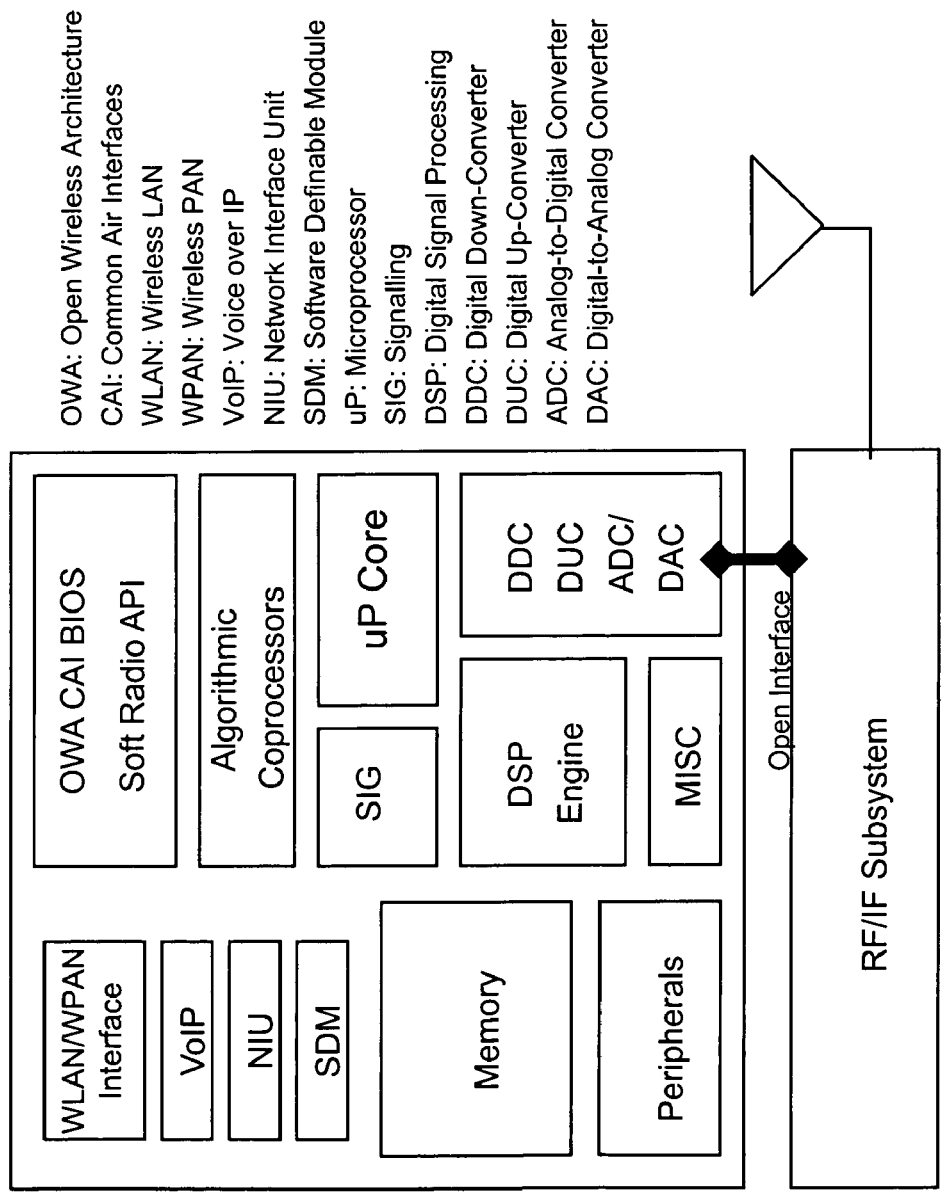
FIG. 1 is a hardware architecture of Integrated Wired and Wireless Mobile Terminal, wherein main functional blocks of this invention are listed.

FIG. 1 is the hardware architecture of the integrated wired and wireless mobile terminal of the present invention, wherein the key functional units are:

Open Wireless Architecture (OWA) Common Air-interface (CAI) BIOS (Basic Input/Output System)—this function unit defines the basic open platform to support various wireless air interfaces (or called radio transmission technologies) including existing standards and future to-be-defined standards. Open architecture is very important for next generation communication systems because it allows different modules and subsystems to be provided by various different vendors through the open interface standards. OWA is different from Software Defined Radio (SDR) in which the operating parameters including frequency range, modulation type, and/or output power limitations can be set or altered by software. In this way, SDR is only one of the functions of OWA system. Hence, Soft Radio API (Application Program Interface) deals with the above parameter settings in the open platform of the present invention.

Wireless LAN/Wireless PAN Interface—this functional unit provides the short range wireless network access including wireless local area network (WLAN, for example IEEE 802.11 standard) and/or wireless personal area network (WPAN, for example IEEE 802.15 or UWB, Ultra Wide Band). However, as utilized hereinafter the term "Wireless LAN/Wireless PAN" refers to any type of short range wireless broadband technology operable in the fashion of "IEEE 802.11/15", but not limited thereto.

"VoIP (Voice over IP)" Unit provides a state-of-the-art solution to transmit real-time voice service over IP networks, wherein the integrated terminal of the present invention may connect to the wired Internet network through a Network Interface Unit (NIU) interface, for example, USB port or Ethernet port, or connect to the Internet through a Wireless LAN, Wireless PAN or other Broadband Wireless Access system, whichever is available with user-defined search order, but not limited thereto.

Software Defined Module (SDM)—this functional module supports multiple wireless standards (air-interfaces) for the integrated terminal of the present invention. The module can be stored in the aforementioned terminal system, or in the external card or downloadable from the Internet. The OWA of this invention supports open air interfaces so that users can change different wireless standards, including existing standards or future standards, by updating or replacing this module, as set forth above, wherein this module may further contain independent processors or DSP (Digital Signal Processing) components in addition to memory units to facilitate signal processing and/or protocol processing of related standards, etc.

Radio Frequency (RF)/Intermediate Frequency (IF) Subsystem is a portable radio unit with open interface to the main functional units of the integrated terminal of the present invention. This separate open radio subsystem is necessary to support various wireless standards running in different frequency bands, wherein the user may change this radio part in case of needs. Additionally, this open radio subsystem supports new wireless transceiver technologies, for example, smart antennas, MIMO (Multiple Input, Multiple Output), High efficiency power amplifiers, Improved RF modules allowing higher operating frequencies and improved receiver sensitivity, etc, but not intended to be limited to such technologies.

Figure 2:
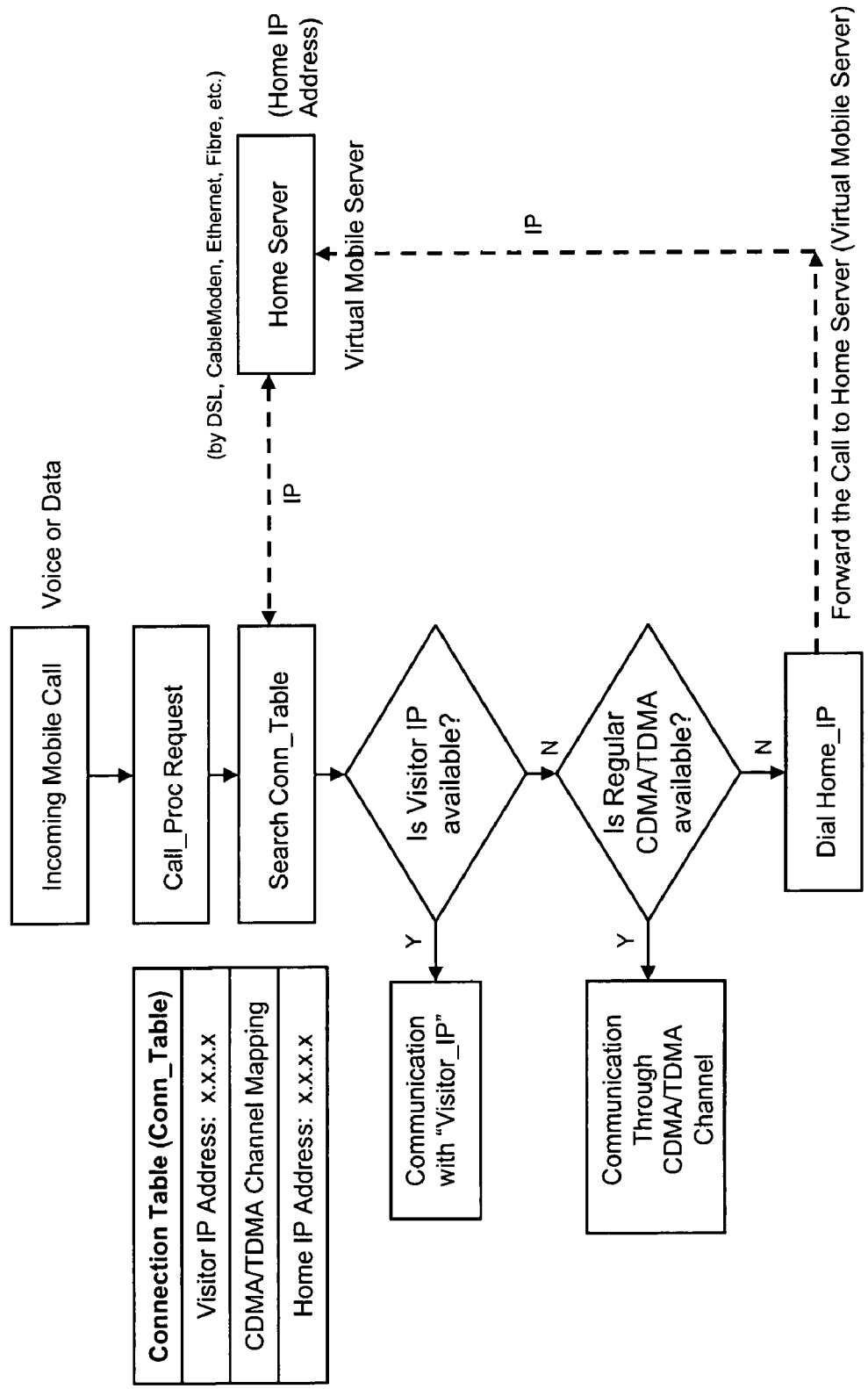
FIG. 2 is the Call Processing Management System in Mobile Switching Center or Mobile Gateway, wherein the incoming calls are further forwarded through IP connection or over the mobile air link channel.

FIG. 2 shows the Call Processing Management System in Mobile Switching Center (MSC) or Mobile Gateway, associated with the integrated terminal of the present invention, wherein the key control procedures are:

The Connection Table (Conn_Table) is frequently updated by the integrated terminal, as set forth above, through specific network connections, wherein "Visitor IP address" is reported in case of wired network connection or short range wireless access connection (for example, WLAN or WPAN). If there are no such IP connections available with the aforementioned integrated terminal, the MSC, as set forth above, together with related base stations, communicates with this integrated terminal over mobile cellular networks, for example, CDMA networks or TDMA networks, but not limited thereto.

When an incoming mobile call request is received, the aforementioned MSC searches the Connection Table associated with the called integrated terminal (or destination terminal in this case) of the present invention. If a Visitor IP address is found, the MSC dials or re-synchronize this IP address, through IP Switch in MSC (or other IP system in different infrastructure), to establish the IP connection accordingly. If this Visitor IP address is not available, and the regular mobile cellular channel (for example, CDMA or TDMA) is found and associated with the called destination terminal number, the MSC connects the related base station to establish the communication with the destination terminal, as set forth above, over the mobile cellular air link/channel. This mobile cellular channel can be either static channel or dynamically assigned channel to optimize the wireless spectrum utilization.

However, it is emphasized that the system and method of the present invention utilizes the terms "MSC, Mobile Gateway, base station, etc", which in the context of the present invention, is meant to include the aforementioned existing CDMA system and TDMA/GSM system, or any other mobile communication infrastructure utilizing different network topology and/or network architecture with different terms which may or may not have all of the functional characteristics of existing CDMA or TDMA standards. As such, the system and method of the present invention is not meant to be limited to current mobile cellular communication infrastructure, and the subsequent specific description utilization and explanation of certain characteristics previously recited as being characteristics of a MSC or base station or Mobile Gateway are not intended to be limited to such technology.

If after searching the Connection Table, as set forth above, both Visitor IP address and mobile cellular channel (including CDMA or TDMA channel) are not found, the aforementioned MSC has to forward the incoming call, over IP connection through possible IP Switch for example, to the user's Virtual Mobile Server (User Home Computer Server with Internet connection), wherein a fixed Home IP address is stored in the aforementioned Connection Table.

Therefore, the call processing management system in MSC (or Mobile Gateway in packet mobile core networks) of the present invention is a minimum modification of the existing mobile communication infrastructure, wherein only the aforementioned Connection Table is updated, and a VoIP interface unit is employed for any voice call over the IP connection.

Figure 3:
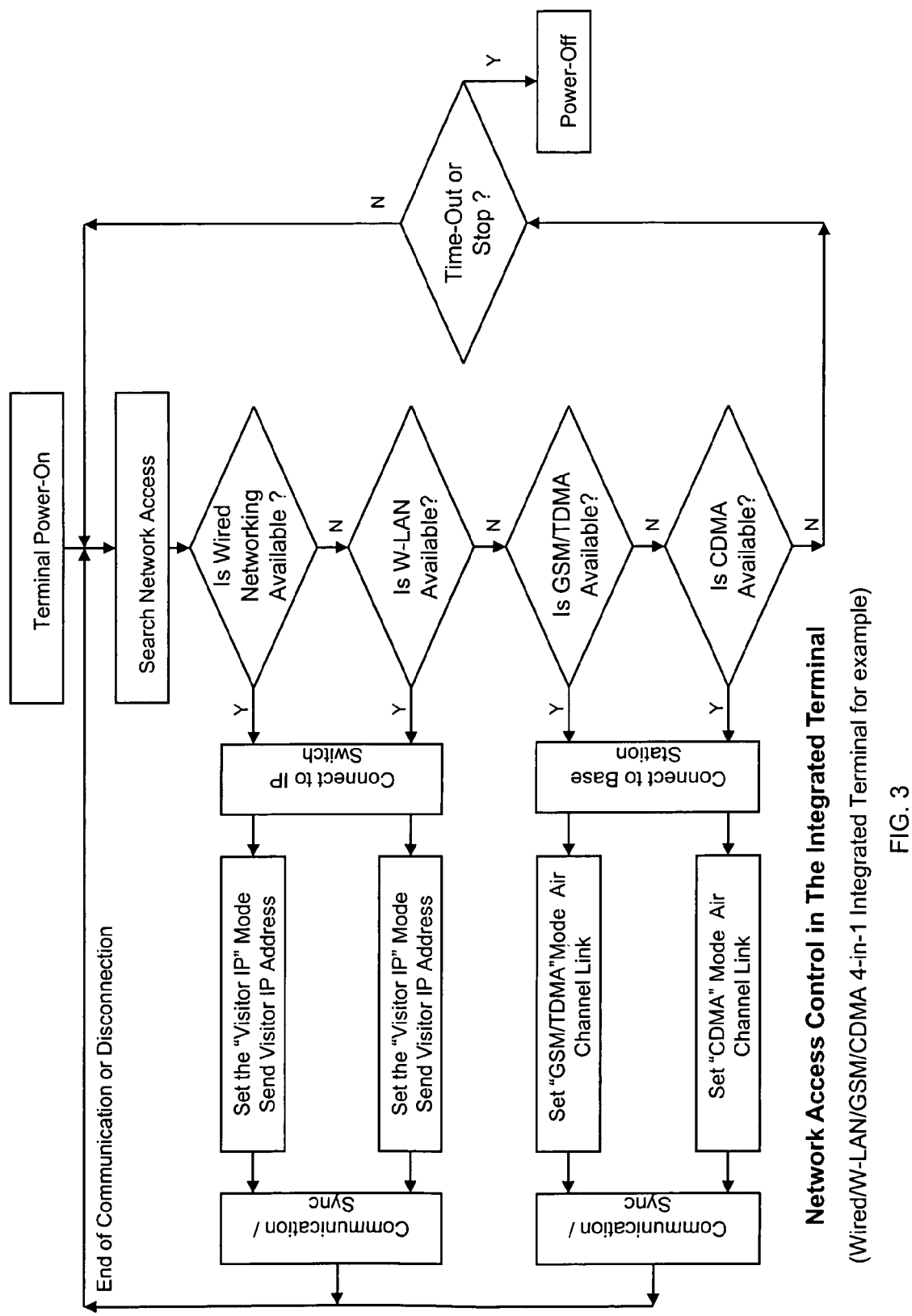
FIG. 3 introduces the Network Access Control scheme in the integrated terminal of the present invention, based on the example of Wired/W-LAN/GSM/CDMA 4-in-1 terminal.

FIG. 3 describes the network access control method in the integrated terminal of the present invention, wherein a Wired/W-LAN/GSM/CDMA 4-in-1 integrated terminal is discussed for example.

After the integrated terminal is powered on, the system of the present invention automatically searches for available network accesses based on criteria and parameters of different communication standards. If a wired Internet connection is found, the integrated terminal of the present invention connects directly to the IP Switch (or other IP system in different communication infrastructure) in the aforementioned Mobile Switching Center (MSC), and sends the "Visitor IP Address", obtained from the local Internet access point, to the aforementioned Connection Table in MSC and sets the "Visitor IP" mode accordingly. Then, the connection may be established through the IP protocol, and the integrated terminal of the present invention becomes synchronized with the aforementioned MSC.

If the wired Internet connection is not available, the integrated terminal of the present invention searches for Wireless LAN (WLAN) access in the local short range area. Since WLAN is only the wireless extension of the wired network in a short range area, if such WLAN access is found, the integrated terminal of the present invention repeats the same procedures, as set forth above, to connect to the aforementioned MSC in the same manner as it does to the wired network.

If both wired network and WLAN are not available, the integrated terminal of the present invention switches back to the mobile cellular mode, for example GSM/TDMA mode or CDMA mode, wherein the specific base station is connected over the specific air channel link.

The aforementioned network access control of the integrated terminal of the present invention is in the priority order of Wired network, WLAN, GSM and CDMA, for example, to maximize the wireless spectrum utilization and broadband services. However, this access control order can be re-defined by the user with the integrated terminal of the present invention. Additionally, the system and the method of the present invention has the function to frequently search for the higher priority network access mode whenever the connection is in the low priority mode to optimize the network access control for the integrated terminal of the present invention.

It is emphasized again that the integrated terminal of the present invention utilizes the examples of "Wired/WLAN/GSM/CDMA" networks, which in the context of the present invention, is meant to include the aforementioned communication standards or any other existing and future standards of wireless and wired transmission technologies. As such, the integrated terminal of the present invention is not meant to be limited to WLAN, GSM and CDMA technologies, and the subsequent specific description utilization and explanation of certain characteristics previously recited as being characteristics of the above standards are not intended to be limited to such technologies.

Figure 4:
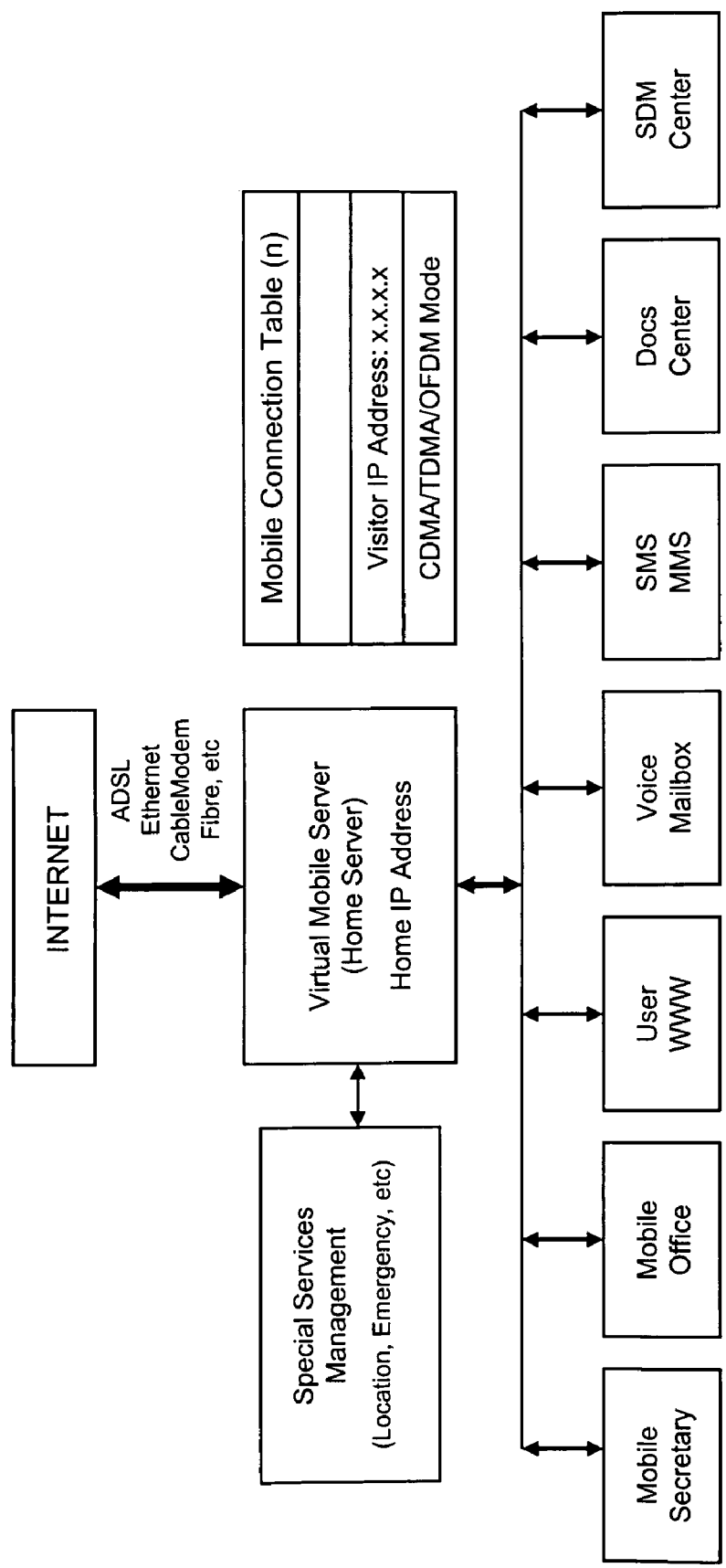
FIG. 4 is a method to configure the user home computer with Internet access as a Virtual Mobile Server of the integrated terminal of the present invention.

FIG. 4 introduces to utilize the user home computer, with Internet access, as a Virtual Mobile Server for the integrated terminal of the present invention, wherein the key characteristics are:

The Virtual Mobile Server, basically a User Home Computer Server, has a fixed Home IP address, connecting to the wireline Internet through Fibre, Cable Modem, Ethernet or DSL (Digital Subscriber Loop), but not limited thereto.

The Virtual Mobile Server, as set forth above, maintains an updated copy of the Connection Table from the aforementioned Mobile Switching Center (MSC) or Mobile Gateway.

One Virtual Mobile Server, as set forth above, can support one or multiple integrated terminals of the present invention, wherein many such terminals can share the same Virtual Mobile Server.

The Virtual Mobile Server, as set forth above, supports such important services and applications as "Mobile Secretary", "Mobile Office", "User Webpage", "Voice Mailbox", "Short Message Service (SMS) and Multimedia Message Service (MMS)", "Game Center", "Document Center" "SDM Center", etc., but not limited thereto.

The Virtual Mobile Server, as set forth above, also provides the integrated terminal of the present invention of Special Services Management such as Location management, Emergency call management, Security and Safety management, Access Optimization, and Operation and Maintenance management, etc., but not limited thereto.

Basically, any computer server with Internet connection and with a fixed IP address can be configured to be an aforementioned Virtual Mobile Server, associated with the integrated terminal of the present invention.

Figure 5:
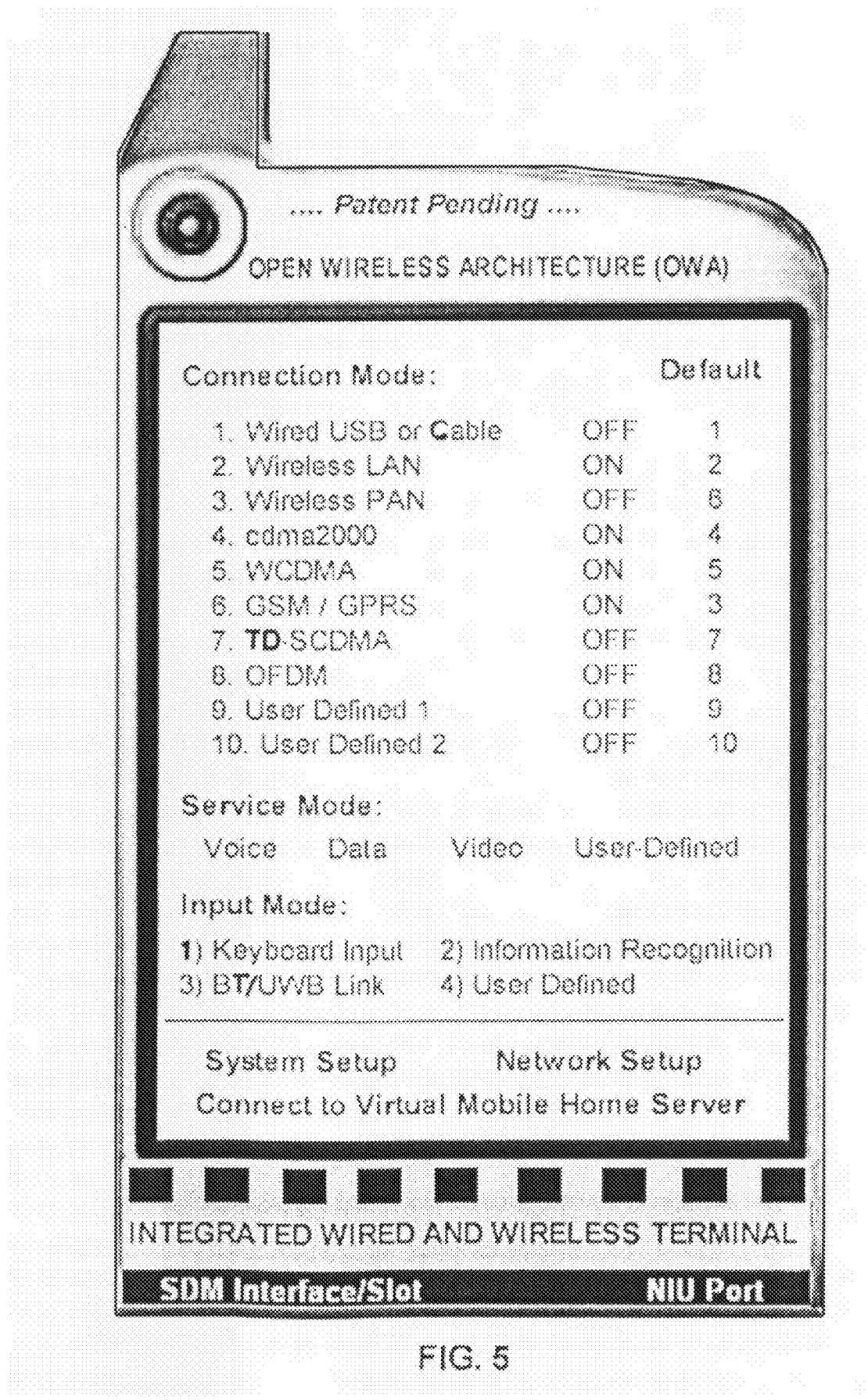
FIG. 5 is a design prototype of the integrated terminal of the present invention, wherein basic functions in services and applications are described.

FIG. 5 defines a prototype Integrated Wired and Wireless Terminal of the present invention, wherein the key characteristics are:

The prototype integrated terminal of the present invention supports various connection modes, for example, wired networks via USB or Cable port, Wireless LAN, Wireless PAN, cdma2000, WCDMA, GSM/GPRS, TD-SCDMA, OFDM or any user defined standards, wherein the network access priority order is defined by the terminal user, for example, Wired USB/Cable mode has the first priority order in the prototype terminal.

"SDM (Software Defined Module) Interface/Slot" is utilized to plug-in the External Card—an external memory card or processing card as set forth above, to install or change the communication standards module including wireless air-interfaces. Additionally, this SDM Slot is also utilized for inserting the system testing module.

In addition to the aforementioned SDM External Card method, the communication standards module can also be downloaded and installed from the Internet through the Network Interface Unit (NIU), as set forth above, wherein the modules may be downloaded from the Virtual Mobile Server, as set forth above.

The prototype integrated terminal of the present invention supports all available services including voice, data and video, and other user defined services.

The prototype integrated terminal of the present invention supports flexible input modes including Keyboard Input (screen keyboard), Information Recognition (including voice recognition and/or text recognition), Bluetooth/Ultra Wide Band wireless Input and other user defined input methods.

Additionally, the prototype integrated terminal of the present invention comprises capabilities to connect with the Virtual Mobile Server, as set forth above, whenever the Internet access is available and the bandwidth allows, to enhance the communication services and applications, retrieve useful information, reconfigure the system setup and optimize the network access control, etc.

The integrated terminal system and method of the present invention is not meant to be limited to the aforementioned prototype terminal, and the subsequent specific description utilization and explanation of certain characteristics previously recited as being characteristics of this prototype terminal are not intended to be limited to such technologies.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A method of a converged network access infrastructure supporting incoming call processing management capabilities for an integrated communication terminal in a Mobile Switching Center (MSC) or Mobile Gateway, said method comprising:
   a) searching a Connection Table in said MSC or said Mobile Gateway for the network access status of said integrated communication terminal,
   b) establishing communication between said MSC and said integrated terminal through an IP (internet protocol) connection when an Visitor IP (internet protocol) address is available in said Connection Table,
   c) forwarding to a related base station to establish communication between said base station and said integrated terminal over a mobile cellular air-link channel when said Visitor P address is not available in said Connection Table, but the address of said mobile cellular air-link channel is available in said Connection Table,
   d) forwarding to a Virtual Mobile Server through IP (internet protocol) connection for further processing if none of the above said addresses is available in said Connection Table.

2. A method as recited in claim 1 comprising reporting said "Visitor IP address" of said integrated terminal to said MSC when said IP connection is established. Said "Visitor IP Address" is changed when said integrated terminal moves to different access location of wireline network or through a short range Wireless LAN (local area network)/Wireless PAN (personal access network) to the wireline network, and accordingly this said "Visitor IP Address" is dynamically updated in said MSC of the user registration.

3. A method as recited in claim 1 comprising utilizing a static mobile cellular air-link channel or a dynamically assigned mobile cellular air-link channel to optimize the wireless spectrum utilization.

4. A method as recited in claim 1 comprising searching for available network accesses based on pre-defined search criteria and priority order set by the user.

5. A method as recited in claim 1 comprising establishing IP (internet protocol) connection with said integrated terminal through a fully wired network or the combination of wired network and said Wireless LAN/Wireless PAN, wherein said Wireless LAN/Wireless PAN is in the short range local access area of said integrated terminal.

6. A method as recited in claim 1 comprising supporting various service calls including data service and voice service, wherein a Voice-over-IP (internet protocol) technology is utilized for said voice service.

7. A system as recited in claim 1 wherein said Virtual Mobile Server comprising:
   a) service function capabilities including mobile secretary, mobile office, voice mailbox, Short Message Service (SMS) and Multimedia Message Service (MMS) and information center,
   b) special services management capabilities including location management, security and safety management, access optimization, and operation and maintenance management,
   c) Software Defined Modules (SDM) center providing on-line secured Internet downloading of Open Wireless Architecture (OWA) modules for said integrated terminal,
   d) a mobile connection table containing the most updated information of said "Visitor IP Address" of said integrated terminal which is "On-Line" of IP (internet protocol) connection.

8. A system as recited in claim 1 wherein said Virtual Mobile Server can be any computer server with Internet connection, and with an IP (internet protocol) address called Home IP (internet protocol) address.

9. A system as recited in claim 1 wherein one said Virtual Mobile Server can support one or multiple said integrated terminals, wherein many such said integrated terminals can share same said Virtual Mobile Server.

10. A system as recited in claim 1 wherein said MSC can be replaced with a Mobile Gateway or simply a mobile network access equipment connecting with the backbone core network or network infrastructure.

11. A method as recited in claim 1 comprising frequently searching for the higher priority network access mode whenever the connection is in the low priority mode to optimize the network access control, improve the wireless spectrum utilization efficiency and maximize the broadband services.

* * * * *